United States Patent [19]

Daverio et al.

[11] Patent Number: 4,817,293

[45] Date of Patent: Apr. 4, 1989

[54] METHOD FOR AXIAL ALIGNMENT OF AN ASSEMBLY FOR IMPLANTING A PARIETAL PROBE IN A REDUCING-SMELTING FURNACE, AND ASSOCIATED IMPLANTING ASSEMBLY

[75] Inventors: Jean-Claude Daverio, Ban-Saint-Martin; Frédéric Grein, Illange, both of France

[73] Assignee: Institut des Recherches de la Siderurgie Francaise-irsid, Maizieres-Les-Metz, France

[21] Appl. No.: 66,485

[22] Filed: Jun. 26, 1987

[30] Foreign Application Priority Data

Jun. 27, 1986 [FR] France ............................. 86 09393

[51] Int. Cl.⁴ .............................................. G01B 7/12
[52] U.S. Cl. ....................................... 33/228; 33/286; 33/263; 33/645; 33/533; 73/863.85
[58] Field of Search .............. 33/645, 533, 263, 286, 33/228; 73/866.5, 863.85

[56] References Cited

U.S. PATENT DOCUMENTS

| | | | |
|---|---|---|---|
| 3,165,835 | 1/1965 | Duncan | 33/286 |
| 3,700,901 | 10/1972 | Broslaw | |
| 3,832,904 | 9/1974 | Dreuw et al. | 73/863.85 |
| 4,053,239 | 10/1977 | Tolmon | 33/286 |
| 4,218,918 | 8/1980 | Ueno et al. | 73/863.85 |
| 4,471,664 | 9/1984 | Mailliet et al. | 73/863.85 |
| 4,521,968 | 6/1985 | Wiltermood et al. | 33/286 X |

FOREIGN PATENT DOCUMENTS 2275789 1/1976 France.

OTHER PUBLICATIONS

Patent Abstracts of Japan, vol. 7, No. 86 (C–161)[123], 9 avril 1983; & JP-A-58 16 005 (Shin Nippon Seitetsu K.K.) 29–01–1983.

Patent Abstracts of Japan, vol. 10, No. 52 (P–432)[2109], 28 fevrier 1986; & JP-A-60 195 408 (Hitachi Seisakusho K.K.) 03-10-1985.

*Primary Examiner*—William D. Martin, Jr.
*Attorney, Agent, or Firm*—Staas & Halsey

[57] ABSTRACT

This method for axially aligning an assembly for implanting a parietal probe through an orifice provided in the wall of a reducing-smelting furnace is applicable to an assembly comprising a tightness device equipped with a sealing off member and a tightness member, a chassis fixed to the furnace and supporting the tightness device and a frame equipped with a probe-holding carriage. The assembly further comprises means for adjusting the position of the frame and means for temporarily fixing coaxially to the tightness device first a telescope directed towards the orifice in order to align the axis of the tightness device with the axis of said orifice, and then a light beam source directed onto a target carried by the carriage in order to align the axis of the probe with the axis of the tightness device.

15 Claims, 2 Drawing Sheets

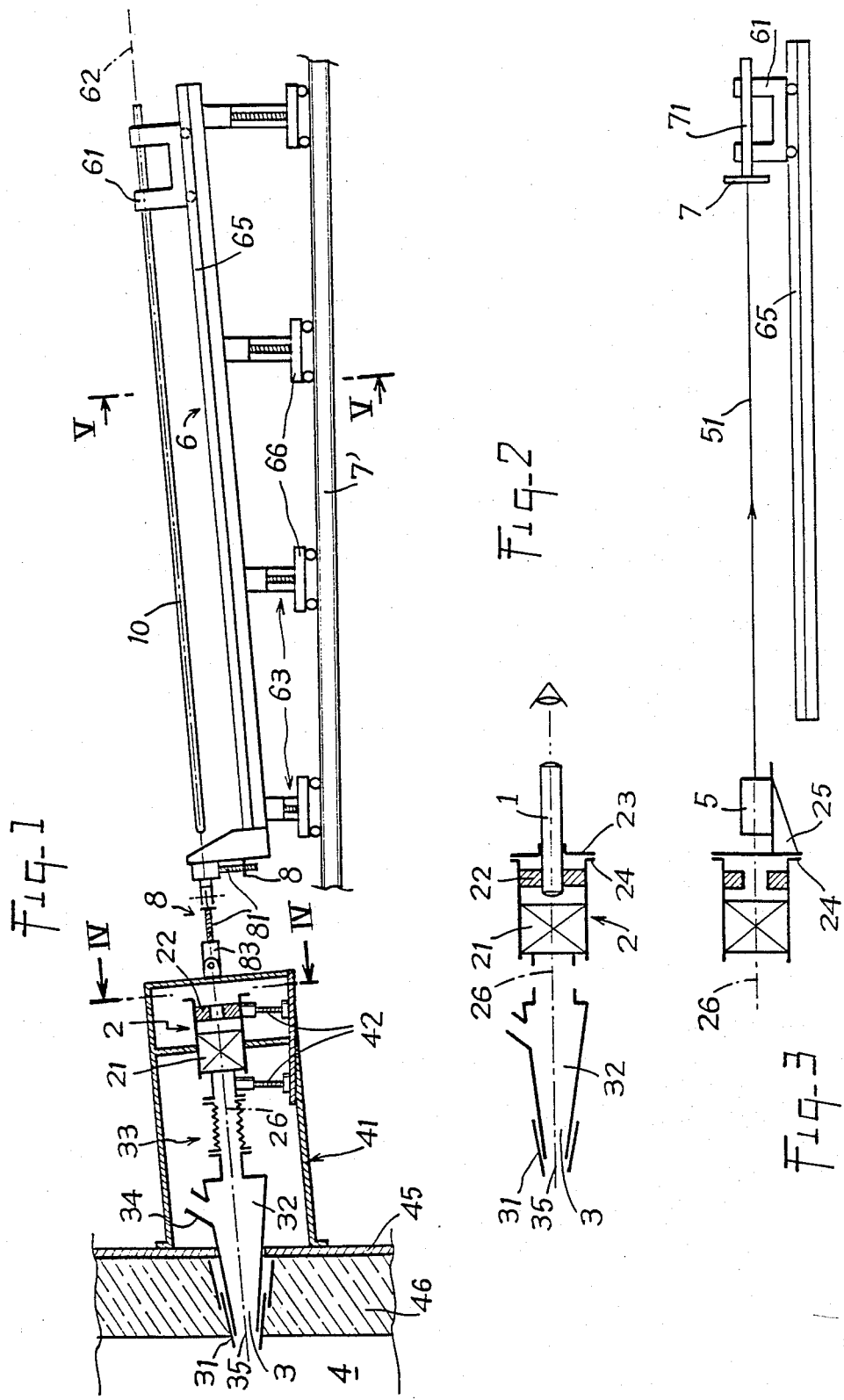

METHOD FOR AXIAL ALIGNMENT OF AN ASSEMBLY FOR IMPLANTING A PARIETAL PROBE IN A REDUCING-SMELTING FURNACE, AND ASSOCIATED IMPLANTING ASSEMBLY

BACKGROUND OF THE INVENTION

1. Field of the Invention

The invention relates to a method for axial alignment of an assembly for implanting a parietal probe in a reducing-smelting furnace, such as a blast furnace. The invention further relates to the means used to obtain such alignment.

2. Description of the Related Art

Several methods are already known for probing reducing-smelting furnaces, among which probings by substantially vertical introduction of the probe through the top aperture of the furnace, and probings by substantially horizontal introduction of the probe through a hole provided in the furnace wall.

The choice of method is essentially guided by the object of the probing. For example, with blast furnaces, if the probing is more particularly directed to the conditions of temperature or pressure at the top part of the stack, the probe is advantageously introduced through the top, where access through the throat of the blast furnace is easier. On the contrary, to probe the characteristics in the hearth or the boshes, a parietal introduction of the probe is preferred.

In the case of a parietal introduction, the probe, which is composed of an elongated rectilinear body, is pushed inside the furnace through an orifice provided in the outer wall of the furnace and in the refractory lining. In order to keep heat losses to a minimum and to prevent deterioration of the wall near the orifice, the latter is preferably of small diameter. In the particular case of a blast-furnace, the passage for the probe is advantageously defined by the orifice of the air blast tuyeres and the diameter of the probe is only slightly smaller than that of said orifice.

Also, due to the high temperatures inside the furnace, and to the noxious gases under pressure therein, the orifice must be made tight, both when the probe is introduced and when it is withdrawn. Tightness is provided by conventional means, generally equipped with a valve or other sealing member, which is closed out of probing periods, and which is associated with a stuffing-box of which the packing encircles the probe when the latter is inserted axially through the tightness device, the valve being then open.

The tightness device can have additional accessories. For example, it can be connected to the wall around the orifice, via an expansion joint which absorbs the deformation differences between the elements subjected to the high temperatures of the furnace, while preserving tightness between the wall and the valve or the stuffing-box.

Due to the thickness of the wall and to the length of the tightness device, the probe must be guided as accurately as possible in order to penetrate without difficulty in the orifice. To this effect, the probe is held, first at the level of the stuffing-box, where it is guided by said stuffing-box or by any adequate device, and second, by an introduction frame which supports the part of the probe not yet introduced into the furnace, said frame being adjustable in height and inclination according to the vertical and to all other directions.

Said frame is used both as a support and guide for the probe, and as a thrusting means, for pushing the probe into the furnace. The thrust is transmitted to the probe by a carriage guided according to a translational movement over the length of the frame and moved by drive members.

An introduction frame for a parietal probe is described for example in U.S. Pat. No. 4,361,315 and a tightness device is described in the U.S. Pat. No. 4,393,703.

The probes used in blast furnaces are normally tubular-shaped, with a cooled wall, and can contain various sampling and measuring equipment. Their length is dependent on the depth to which they are to be introduced into the furnace, and on the length of the tightness device. For a penetration as far as the axis of a modern blast furnace, the length of the probe can exceed 10 meters. The total length of the implanting assembly is therefore important and can reach to around 20 meters.

Because of these great lengths, of the small diameter of the orifice and of the probe (for example less than 100 mm) and of the exerted thrusting force, the probe has a tendency to bend through buckling. Also, due to the cantilever which may be important between the point of support of the probe body on the frame or on the tightness device and the orifice in the furnace wall, the end of the probe nose may move aside of the orifice axis.

In certain cases, the outer wall of the furnace may move with respect to its refractory lining, which can alter the relative position of the orifice in the refractory lining with respect to the tightness device which is joined to the outer wall.

It will therefore be understood that not only should the probe be firmly held and guided on the frame and on the tightness device, but also the axes of both and of the orifice must be in perfect alignment.

SUMMARY OF THE INVENTION

It is the object of the present invention to meet the aforesaid requirements and to ensure ready introduction of a parietal probe in a reducing-smelting furnace, such as a blast furnace.

Another object of the invention is to prevent contact and friction between the probe and the periphery of the introduction orifice.

Still a further object of the invention is to prevent deformation of the probe through bending.

These objects are reached according to the invention with a method for axially aligning an assembly for implanting an elongated rectilinear parietal probe in a reducing-smelting furnace through an orifice provided in the wall of said furnace, the implanting assembly comprising a tightness device along the axis of which the probe should move in order to penetrate into the furnace, said tightness device being adjustable in position around the axis of the wall orifice and comprising a sealing off member ensuring tightness when the probe is withdrawn, and a tightness member ensuring tightness when the probe is introduced, the implanting assembly further comprising a frame for moving the probe and introducing it into the furnace, said frame, which is equipped with means for adjusting its height and vertical inclination, being equipped with a probe-holding carriage, movable according to a translatory movement along the axis of the probe.

According to the invention, said method consists in first placing a sighting telescope on the tightness device and coaxially thereto, sighting the orifice of the furnace, adjusting the position of the tightness device in such a way as to bring the sighting axis to coincide with the orifice axis, then replacing the telescope by a light beam-emitting source also centered on the tightness device and directed towards the probe introduction frame onto an aiming target provided on the carriage and centered on the axis of the probe, moving the carriage on the frame and adjusting the position of said frame so that, whatever the position of the carriage on the frame, the light beam reaches the center of the aiming target.

One particular advantage of the method according to the invention is that it makes it possible to readily obtain an accurate alignment of the tightness device and of the probe moving device (frame) along the axis of the furnace wall orifice.

Another advantage of the method is that it permits positioning of the tightness device and positioning of the frame, independently. It is, in particular, possible to adjust the tightness device once and for all and then to use it as a reference for the alignment of the frame for successive probing operations between which the frame can be moved, for example, away in order to free the access to the furnace.

According to one particular embodiment of the invention, the method is characterized in that, the sealing off member being closed, the telescope is fixed in a tight manner on the tightness device, at the end thereof farthest from the furnace, and then the sealing off member is opened in order to sight the orifice.

In this case, it is easy to obtain the alignment of the tightness device, even when the furnace is working and contains very hot or noxious gases.

The invention makes it possible to position the tightness device and the frame with accuracy and in all safety despite the very severe ambient conditions.

The use of a light beam source for aligning the frame is also a way of simplifying the adjusting operations, since the source remains fixed and since the adjustments of the frame are made where the carriage and aiming target are situated, i.e. where it is easy for the operator to center the aiming target on the light beam, since said aiming target is then close to him and very visible.

Another object of the invention is to provide an assembly for implanting a rectilinear elongated parietal probe into a reducing-smelting furnace, said assembly comprising a tightness device along the axis of which the probe should move in order to penetrate into the furnace, the tightness device comprising a sealing off member ensuring tightness when the probe is removed, and a tightness member ensuring tightness when the probe is inserted, said implanting assembly further comprising a chassis rigidly fixed to the furnace wall and supporting the tightness device, and a frame equipped with a probe-holding carriage which is movable according to a translatory movement along the axis of said probe.

According to the invention, said implanting assembly comprises means for adjusting the position of the tightness device with respect to the chassis, means for adjusting the position of the frame heightwise and its orientation in space, and means for temporarily positioning and fixing on or close to said tightness device and coaxially thereto a sighting telescope or a light beam emitting source.

Advantageously, the frame is fixed to the chassis by way of articulated fasteners.

One advantage of the implanting assembly according to the invention resides in the fact that the meas for adjusting on the one hand, the tightness device, and on the other hand, the frame, can be actuated independently one from the other thereby offering great flexibility in the control operations.

BRIEF DESCRIPTION OF THE DRAWINGS

The invention will be more readily understood on reading the following description with reference to the accompanying drawings, in which:

FIG. 1 is a diagrammatical view of a probe implanting assembly,

FIGS. 2 and 3 are diagrams illustrating two steps of the alignment method,

DETAILED DESCRIPTION OF THE PREFERRED

Figure 4:
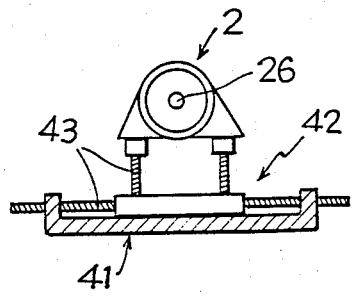
FIG. 4 is a diagrammatical illustration of a system for adjusting the tightness device, viewed from the direction of the axis of said device.

The illustrated example is that of the implantation of a probe through the orifice 3, of axis 35, of a tuyere 31, conventionally known as a hot blast tuyere, in blast furnace 4. The nozzle is shown as 32, and as the blast pipe 34 brings the hot blast from a circular pipe (not shown). The wall of the blast furnace is constituted by an external metallic jacket 45 and a refractory lining 46. The tightness device 2 is tightly connected to the nozzle 32 via an expansion sleeve 33 which is deformable, thereby allowing a certain mobility of the tightness device.

Said tightness device 2, of longitudinal axis 26 comprises a valve 21 which is closed to ensure tightness when the probe is withdrawn out of the device, and a stuffing-box 22 of which the packing encircles the probe in tight manner as soon as said probe is introduced into the device. In this way, tightness is still ensured, and the valve can be opened in order to proceed with the introduction of the probe into the furnace.

The tightness device 2 is supported by means of two adjusting systems 42 on a chassis 41 rigidly fixed on the jacket 45 of the blast furnace.

The probe supporting and pushing frame 6 is constituted by two longitudinal bars 65 forming a guide-rail for a carriage 61 moving the probe 10. Said carriage is moved by a system of chains driven by hydraulic motors (not shown). The frame rests on a runway 7' on the floor of the blast furnace, via supports 63 of adjustable height, fixed on carriage 66.

Figure 6:
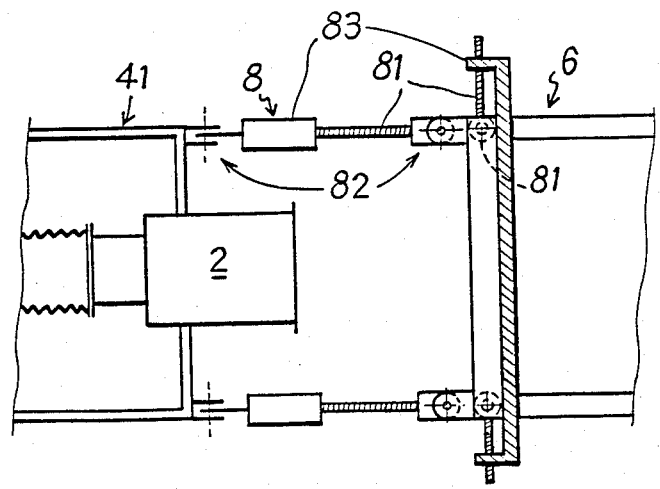
FIG. 6 is a diagrammatical illustration of a plan view of an adjustable frame-tightness device connection.

The frame 6 is secured to chassis 41 by connections 8 comprising articulations 82, such as of cardan type, permitting relative angular movement of the frame 6 with respect to the chassis 41 (FIG. 6). Two control systems 83 are adjustable in the three directions, i.e. along the axis of the probe, and, perpendicularly to said axis, horizontally and substantially vertically. It is possible with these articulation and control systems, to adjust the frame in any direction and in any angular position.

The strain of reacting to the thrust exerted for introducing the probe, undergone by the chassis 41, is transmitted to the jacket 45 of the blast furnace via connections 8. Due to the disposition of these connections on each side of the chassis and to their control system 83, the reacting strain is applied axially, this preventing, in the case of a strong strain, all risk of deformation and misalignment of the assembly.

Figure 5:
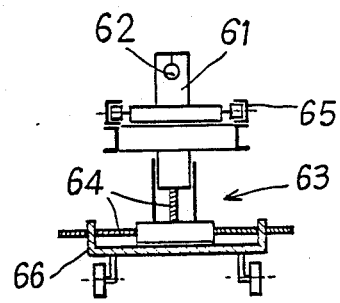
FIG. 5 is an illustration of the frame adjusting system, viewed from the direction of the probe axis.

The frame supports 66 (FIG. 5) comprise two adjusting systems 63 working in two orthogonal directions; vertically and horizontally in a direction perpendicular to axis 62 of the probe. Said supports are distributed over the length of the frame in order to prevent it from bending due to its great length. One support 66 is placed close to each end of the frame and one or more intermediate supports are provided in the median part. As will be seen hereinafter with reference to the aligning method, said adjustable supports permit the accurate positioning of the frame plumbed with the point where they are placed.

The system 42 controlling the tightness device 2 also act in the vertical and horizontal directions, perpendicularly to the axis 26 of the device. These systems 42 are spaced apart one from the other and have a certain freedom of articulation so as to move the tightness device horizontally and vertically, and also angularly with respect to axis 35 of the orifice 3 of the tuyere.

Systems 42, 63, 83 controlling the tightness device 2, the frame 6 and the connections 8 are all equipped with screws 43, 64, 81 and can be hand- or motor- operated.

For the alignment of the implantation device, supports and fastening means are provided for the aligning equipments both on the tightness device 2 and on the probe holding carriage 61. To this effect, the tightness device is provided with an annular flange 24. On said flange can be centered and fixed in tight manner, either a plate 23 supporting a sighting telescope 1 (FIG. 2), or a console 25 supporting the light beam source 5, which can be a laser beam source (FIG. 3). Other centering and connection means can be used, the sole condition being the accurately coaxial localization of the apparatus (telescope and laser) used with the tightness device. In particular, and if the conditions inside the blast furnace permit, the optical sighting telescope 1 can be placed inside the stuffing-box, care being taken to adapt their respective diameters in order to preserve a good tightness.

Moreover, the aiming target 7, which is necessary for aligning the frame with the laser, is fixed and centered on the end of a "dummy-probe" 71 which is constituted of a piece of similar shape and dimensions as the probe-driving part fixed to the carriage 61, and which can therefore be adapted on said carriage in such a way that the center of the target is placed on the axis of the probe.

The method for aligning the different parts of the implantation assembly will now be described. The alignment is performed in two main phases which are: the alignment of the axis 26 of the tightness device 2 on axis 35 of the tuyere orifice 3, then the alignment of axis 62 of the carriage 61 (which is also the axis of the probe, when this is mounted on the carriage) on axis 26 of the tightness device. To align the tightness device 2, a sighting glass or telescope 1 is placed towards the end of said device farthest from the blast furnace, said telescope being optionally provided with suitable filters for viewing the very hot part of the blast furnace, according to one of the centering and fixing modes described hereinabove. When tightness is secured, valve 21 is opened. It is then possible to look through the telescope and to sight the orifice 3 of the tuyere of the blast furnace. Then the position and orientation of the telescope, hence of the tightness device, are adjusted by way of control systems 42 so as to center orifice 3 exactly in the view finder of the telescope. The different adjusting screws 43 are then locked. Valve 21 is closed and the telescope and its support are removed and replaced by console 25 supporting the laser source 5, the laser beam being directed towards the frame 6 along the axis of the tightness device.

Frame 6 is brought close to chassis 41 and attached thereto by its adjustable connections 8. The aiming target 7 fixed on the dummy-probe 71 is positioned on the carriage 61 which carriage is brought close to one end of the frame 6, for example, the end which is closest to the light source 5, and is positioned plumb with the first adjustable support 63 starting from the blast furnace. The control system 63 of said support are then adjusted, and optionally, those 83 of connections 8 for joining the frame 6 to the chassis 41, until the center of the target 7 coincides with the light point formed on said target by the light beam 51.

The carriage 61 is moved to the other end of the frame and the corresponding supports 63 are also adjusted. Said carriage is then brought to a position plumb with each intermediate support, in order to make the necessary adjustments. The adjustments of the intermediate supports serve to correct any failure in the straightness of the frame 6, such failure being mainly due to the bending of the lonitudinal bars 65 caused by their great length.

It may prove necessary, in order to perfect the alignment, to re-adjust the different control systems more than once. A final control can be made by moving the carriage continuously from one end of the frame to the other, and by checking the centering of the laser beam on the target.

Then, the target, the laser, and its support are removed before positioning the probe and proceeding to its introduction into the blast furnace.

Obviously the invention is not limited to the description given hereinabove but also covers many variants or equivalent embodiments, as long as the claimed characteristics are observed.

For example, connections 8 joining the frame to the chassis 41 can be replaced by wedge members placed on the runway 7' to prevent the frame from moving backwards when the probe is introduced.

Similarly, although the use of a laser source 5 is an advantageous factor, it is not an obligation. A source emitting a beam of light, even of non-coherent light, but which is sufficiently restrained to obtain a non-diffuse light spot on the target will be quite suitable.

Also, what is meant by axis 35 of the orifice 3 is not necessarily the straight line passing through the center of said orifice and from every point of which said orifice can be seen under a maximum solid angle, but also the family of straight lines forming a bundle around it and from which said orifice is seen under a solid angle defining a passage of sufficient cross-section to allow the introduction of the probe into the furnace. As a practical measure, the telescope will be aligned on the right of the beam which passes through the center of the rear opening of the nozzle 32, not shown in the figures.

What is claimed is:

1. Method for axial alignment of an implanting assembly for the implantation of an elongated rectilinear parietal probe in a reducing-smelting furnace, such as a blast furnace, through an orifice having an axis and being provided in a wall of said furnace, wherein the implanting assembly includes a tightness device having an axis along which the probe is movable in order to penetrate into the furnace, said tightness device being adjustable in position around the axis of the wall orifice, wherein the implanting assembly further includes an adjustable frame for guiding the probe, which is movably mounted on a carriage carried by said frame, into and out of the furnace, said method comprising the steps of:

placing a sighting telescope coaxially on the tightness device, sighting the orifice of the furnace with the telescope, adjusting the position of the tightness device to align the axis of the orifice with that of the tightness device in accordance with the sighting, replacing the telescope with a light beam-emitting source coaxial with the tightness device and being directed towards the adjustable frame at an aiming target provided on the carriage, the center of the target corresponding to the axis of the probe, and moving the carriage to various positions along the frame and adjusting the position of the frame at each position of the carriage so that the light beam strikes the center of the target at each position of the carriage.

2. Method as claimed in claim 1, wherein the tightness device includes a sealing off member and the method further comprises closing the sealing off member prior to placing the telescope in a tight manner on the tightness device at its end farthest from the furnace, and then opening the sealing off member in order to sight the orifice.

3. Method as claimed in claim 1, wherein said step of adjusting the position of the frame comprises placing the carriage first towards one end of the frame, adjusting the position of said frame at that point, then adjusting the position of the frame at the other end of the frame, and then adjusting the position of the frame at intermediate points between the two ends.

4. Method as claimed in claim 1, wherein the light beam source is a laser source.

5. Assembly for the implantation of a rectilinear elongated parietal probe in a reducing-smeltering furnace such as a blast furnace through an orifice having an axia and being provided in the wall of said furnace, said assembly comprising, a tightness device having an axis along which the probe is movable in order to penetrate into the furnace, said tightness device including a sealing off member for closing the orifice when the probe is removed, and a sealing member for ensuring tightness when the probe is inserted, and a chassis rigidly fixed to the furnace wall and supporting the tightness device, an adjustable frame equipped with a probe-holding carriage which is movable according to a translatory movement along the axis of said probe, first adjusting means for adjusting the position of the axis of the tightness device to coincide with the axis of the orifice, second adjusting means for adjusting the position of the frame to align the axis of the probe with the adjusted axis of the tightness device, first alignment means for determining the alignment of the orifice and tightness devices axes, and second alignment means for determining the alignment of the probe and the tightness device axes.

6. Assembly as claimed in claim 5, wherein the first adjusting means comprises, at least one tightness device adjusting system for adjusting the position of the tightness device in a vertical direction and in a horizontal direction, both horizontal and vertical directions being substantially perpendicular to the axis of the tightness device.

7. Assembly as claimed in claim 5, wherein the second adjusting means comprises, at least one frame adjusting system for adjusting the position of the frame in a vertical direction and in a horizontal direction, both the vertical and horizontal directions being substantially perpendicular to the axis of the frame.

8. Assembly as claimed in claim 6, wherein the at least one tightness device adjusting system comprises two tightness device adjusting systems joined to the chassis and to the tightness device, the two tightness device adjusting systems being spaced apart on opposite sides of the axis of the tightness device.

9. Assembly as claimed in claim 7, wherein the at least one frame adjusting system comprises at least three frame adjusting systems, with one being placed at each opposite end of the frame.

10. Assembly as claimed in claim 5 further comprising, articulated connection means for connecting the frame to the chassis, whereby thrusting force generated by insertion of the probe is transmitted from the frame through the articulated connection means to the chassis and then to the furnace.

11. Assembly as claimed in claim 5, wherein the first adjusting means comprises first and second screw members.

12. An apparatus for aligning an elongated probe with an orifice provided in a wall of a furnace, the apparatus comprising:

a tightness device adjustably mounted adjacent the orifice, the tightness device having a central axis in communication with the orifice, a value for sealing off the central axis when the probe is withdrawn from the orifice, and a sealing member for sealing around the probe when the probe is inserted into the orifice, first alignment means for aligning the axis of the orifice with the axis of the tightness member, a frame movably supporting a carriage, the carriage supporting the probe for axial movement into and out of the orifice, second alignment means for aligning the axis of the probe with the axis of the tightness device, first adjustment means for adjusting the position of the tightness device, and second adjustment means for adjusting the position of the frame.

13. An apparatus as claimed in claim 12, wherein the first adjustment means comprises a site coaxially mounted in the tightness device.

14. An apparatus as claimed in claim 12, wherein the second adjustment means comprises a light emitting device coaxially mounted in the tightness device and being aimed towards the frame, and a target placed on the carriage and having a center coinciding with the axis of the probe.

15. An apparatus as claimed in claim 14, wherein the second adjustment means adjusts the position of the frame to align the center of the axis of the tightness member along the length of the frame.

* * * * *